(12) United States Patent
Wasley (10) Patent No.: US 10,145,505 B2
(45) Date of Patent: Dec. 4, 2018

(54) ANCHORING SYSTEM AND METHODS

(71) Applicant: Jason Wasley, Perth (AU)

(72) Inventor: Jason Wasley, Perth (AU)

( * ) Notice: Subject to any disclaimer, the term of this patent is extended or adjusted under 35 U.S.C. 154(b) by 0 days.

(21) Appl. No.: 15/328,974

(22) PCT Filed: Jul. 23, 2015

(86) PCT No.: PCT/AU2015/050416
§ 371 (c)(1),
(2) Date: Jan. 25, 2017

(87) PCT Pub. No.: WO2016/011508
PCT Pub. Date: Jan. 28, 2016

(65) Prior Publication Data
US 2017/0211744 A1    Jul. 27, 2017

(30) Foreign Application Priority Data

Jul. 25, 2014 (AU) .................................. 2014902896

(51) Int. Cl.
| | | |
|---|---|---|
| *F16M 11/00* | (2006.01) | |
| *F16M 13/02* | (2006.01) | |
| *E21F 17/18* | (2006.01) | |
| *G01C 15/00* | (2006.01) | |
| *F16B 1/00* | (2006.01) | |

(52) U.S. Cl.
CPC ............. *F16M 13/02* (2013.01); *E21F 17/18* (2013.01); *F16B 1/00* (2013.01); *G01C 15/00* (2013.01); *G01C 15/004* (2013.01); *F16B 2001/0035* (2013.01)

(58) Field of Classification Search
USPC ....................................................... 248/216.1
See application file for complete search history.

(56) References Cited

U.S. PATENT DOCUMENTS

| | | |
|---|---|---|
| 3,405,377 A | 10/1968 | Pierce |
| 3,916,821 A * | 11/1975 | Pies ....................... G01C 15/04 |
| | | 116/209 |
| 4,643,604 A | 2/1987 | Enrico |

(Continued)

OTHER PUBLICATIONS

International Search Report (Form PCT/ISA/210) for International Patent Application No. PCT/AU2015/050416 dated Dec. 3, 2015, 6 pages.

(Continued)

*Primary Examiner* — Monica E Millner
(74) *Attorney, Agent, or Firm* — Withrow & Terranova, P.L.L.C.; Vincent K. Gustafson (57) ABSTRACT

An anchoring system (10) comprising an anchor (12) and a pin member (14). The anchor (12) comprises a body (16) configured to be inserted in a support surface (18). The body (16) provides an elongate passage ((22) configured to receive and support the pin member (14). The elongate passage (22) provides an open end (30) providing an opening (32). The opening (32) is provided for receiving an end (34) of the pin member (14) therethrough. The anchor (12) and pin member (14) provide a fastening arrangement (36) for fastening the pin member (14) within the passage (22), when the pin member (14) is inserted through the opening (32) into position within the passage (22).

12 Claims, 8 Drawing Sheets (56) References Cited

U.S. PATENT DOCUMENTS

| | | | | |
|---|---|---|---|---|
| 4,982,701 | A * | 1/1991 | Papak | A01K 1/04 |
| | | | | 119/786 |
| 5,098,057 | A * | 3/1992 | Gran | E02D 5/801 |
| | | | | 248/156 |
| 5,569,007 | A | 10/1996 | Abraham | |
| 5,809,700 | A * | 9/1998 | Roush | E04H 15/003 |
| | | | | 135/117 |
| 6,124,935 | A | 9/2000 | Matthews | |
| 6,457,246 | B1 | 10/2002 | Frazer et al. | |
| 8,756,877 | B2 * | 6/2014 | LaCrosse | E02D 5/805 |
| | | | | 405/259.1 |
| 2006/0148595 | A1 * | 7/2006 | Bostock | A63B 57/207 |
| | | | | 473/407 |
| 2009/0007479 | A1 * | 1/2009 | Jerome, Sr. | A01M 31/06 |
| | | | | 43/2 |
| 2014/0096467 | A1 * | 4/2014 | Norton | E04F 13/0833 |
| | | | | 52/582.2 |

OTHER PUBLICATIONS

Written Opinion (Form PCT/ISA/237) for International Patent Application No. PCT/AU2015/050416 dated Dec. 3, 2015, 9 pages.

* cited by examiner

ANCHORING SYSTEM AND METHODS

PRIORITY DOCUMENTS

The present invention is a 35 U.S.C. § 371 national phase filing of International Application No. PCT/AU2015/050416 filed on Jul. 23, 2015, and claims priority from Australian Patent Application 2014902896 filed 25 Jul. 2014 by the current applicant. The entire disclosures of International Application No. PCT/AU2015/050416 and Australian Patent Application 2014902896 are hereby incorporated by reference herein in their respective entireties for all purposes.

TECHNICAL FIELD

The present invention relates to anchoring systems and methods.

The invention has been devised particularly, although not necessarily solely, in relation to anchoring systems for securing survey instruments to support surfaces such as walls of underground mines.

BACKGROUND ART

The following discussion of the background art is intended to facilitate an understanding of the present invention only. The discussion is not an acknowledgement or admission that any of the material referred to is or was part of the common general knowledge as at the priority date of the application.

Lasers are used for the alignment of development headings in underground mines. In particular, pen-sized lasers are being used for the alignment of development relative short headings.

The use of pen-sized lasers has its difficulties. Typically, mounting of these types of lasers on the walls of the headings is a cumbersome procedure. This is because typically brackets and bolting are required for attaching the laser to the wall.

Anchoring means have been developed for fastening the lasers to the walls. However, these anchoring means include switch means that are, for example, turned on and off during attachment of the laser to the anchoring means. In particular, during attachment of the laser to the anchoring means, an electric circuit is closed turning on the laser; during detachment of the laser from the anchoring means, the electric circuit is broken turning off the laser.

These anchoring means have several drawbacks. In particular, the fact that the anchoring means include the switch means increases the production costs of the anchoring means. Also, these anchoring means include working parts that easily get damaged during fastening of the anchoring means to the walls of the mine headings and during operation of the lasers. This is particularly, true in view that the survey instruments are being operated in underground mines.

Further, the fact that the laser can only be turned on and off when being attached or detached to the anchoring means is particular disadvantageous. This is because the laser can only be used in conjunction with the attachment means.

It is against this background that the present invention has been developed.

SUMMARY OF INVENTION

According to a first aspect of the invention there is provided an anchoring system comprising an anchoring means and a pin member, the anchoring means comprising a body adapted to be inserted in a support surface, the body having at least one passage adapted to receive the pin member, wherein the body is adapted for fastening the pin member within the passage.

Preferably, the body comprises first means for fastening the pin member within the passage.

Preferably, the first means comprises magnetic material.

Preferably, the first means comprise at least one magnet located within the passage.

Preferably, the pin member comprises at least one portion for abutment to the magnet, the at least one portion comprises metallic material for securing the pin member within the passage.

In an arrangement, the pin member comprises an alignment member adapted to receive a laser.

Preferably, the laser is operated independently from the anchoring means.

Preferably, the anchoring means is adapted to receive a cap for closing the passage of the anchoring means.

Preferably, the cap is adapted to be releasably attached to the anchoring means.

Preferably, the cap comprises a threaded end.

Preferably, the body of the anchoring means comprises a proximal end adapted receive either the cap or the laser.

Preferably, the proximal end comprises an inner thread counterpart to thread of the cap for releasably attaching the cap to the anchoring means.

Preferably, the cap comprises metallic material.

Preferably, the cap comprised a twine traversing the cap.

In an alternative arrangement, the pin member comprises means for fastening the pin member within the passage.

Preferably, the means for fastening the pin member within the passage comprises magnetic material.

Alternatively, the means for fastening the pin member within the passage comprises a ball detent locking system.

According to a second aspect of the invention there is provided an anchoring means for attaching a good to a support face, the anchoring means comprising a body adapted to be inserted in a support surface, the body having at least one passage adapted to receive a pin member, wherein the body is adapted for fastening the pin member within the passage.

Preferably, the pin member is adapted for attachment of the good.

Preferably, the body comprises first means for fastening the pin member within the passage.

Preferably, the first means comprises magnetic material.

Preferably, the first means comprise at least one magnet located within the passage.

Preferably, the pin member comprises a proximal end adapted for attaching the good, and a distal end adapted to be fastened within the anchoring means.

According to a third aspect of the invention there is provided a survey instrument comprising a pin member and a laser, the pin member having a proximal end adapted to receive the laser, and a distal end adapted to be fastened to a support surface.

Preferably, the proximal end comprises means for attaching a laser.

Preferably, the means for attaching a laser comprise a threaded section for attachment to a counterpart section threaded counterpart section.

In an alternative arrangement, the means for attaching a laser are adapted to receive a great variety of lasers and in particular pen-sized lasers.

Preferably, the distal end is adapted to be fastened to an anchoring means comprising a body adapted to be inserted in the support surface, the body having at least one passage adapted to receive at least the distal end of the pin member, wherein the body is adapted for fastening the pin member within the passage.

Preferably, the body comprises magnetic material and the distal end of the pin member comprises metallic material to allow fastening the pin member with in the body.

Preferably, the pin member comprises an alignment member adapted to be received by the anchoring means to align the laser substantially with the anchoring means.

According to an aspect of the present invention there is provided an anchoring system comprising an anchor and a pin member, the anchor comprising a body configured to be inserted in a support surface, the body having an elongate passage configured to receive and support the pin member, the elongate passage having an open end providing an opening, the opening for receiving an end of the pin member therethrough; the anchor and pin member providing a fastening arrangement for fastening the pin member within the passage when the pin member is inserted through the opening into position within the passage.

Preferably the fastening arrangement includes magnetic material for fastening the pin member within the passage by holding the pin member in position.

Preferably the magnetic material allows the pin member to be detached by a pulling force applied to the pin member, when the pin member has been inserted through the opening into position within the passage.

Preferably the magnetic material is provided by the anchor with the magnetic material being located at an end of the passage opposite the open end of the passage.

Preferably the magnetic material comprises a magnet and the body includes an endcap and a body portion; the body portion for providing the elongate passage; and the endcap having a mount for mounting the magnet and a connector able to be connected to the anchor body portion.

The magnetic material, in some embodiments, is provided by the pin member with the magnetic material being located at an end of the pin member, the end of the pin member being the end that is first inserted through the opening of the passage when positioning the pin member within the passage.

Preferably the fastening arrangement includes at least one magnet located within the passage. Preferably the magnet is provided at the bottom of the passage.

Preferably, a portion of the pin member is provided for abutting the magnet, the at least one portion comprising metallic material for securing the pin member within the passage.

Preferably, the portion of the pin member comprises the end of the pin member that is first inserted through the opening of the passage when positioning the pin member within the passage.

In an embodiment the anchoring system is provided as a laser survey system; the pin member comprising an alignment member configured to receive a laser.

According to a another aspect of the invention there is provided an anchor system, the anchor system comprising a body adapted to be inserted in a support surface, the body having an elongate passage adapted to receive and support the pin member, the elongate passage having an open end providing an opening, the opening for receiving an end of a pin member therethrough; the anchor including magnetic material for fastening the pin member within the passage when the pin member is inserted through the opening into position within the passage.

Preferably the magnetic material comprises a magnet and the body includes an endcap and a body portion; the body portion for providing the elongate passage; and the endcap having a mount for mounting the magnet and a connector able to be connected to the anchor body portion.

Preferably the anchor comprises a laser survey anchor for mining environments.

According to a another aspect of the invention there is provided a pin member configured to be received by an elongate passage of an anchor adapted to receive and support the pin member, the elongate passage having an open end providing an opening, the pin member for being inserted into the opening; the pin member including magnetic material for fastening the pin member within the passage by holding the pin member in position.

Preferably the pin member comprises a laser survey instrument for mining environments.

According to another aspect of the invention there is provided a laser survey system comprising: an anchor and a pin member, the anchor comprising a body configured to be inserted in a support surface, the body having an elongate passage configured to receive and support the pin member, the elongate passage having an open end providing an opening, the opening for receiving an end of the pin member therethrough; the anchor and pin member providing a fastening arrangement for fastening the pin member within the passage when the pin member is inserted through the opening into position within the passage.

According to a another aspect of the invention there is provided an anchoring system comprising an anchor and a pin member, the anchor comprising a body adapted to be inserted in a support surface, the body having at least one passage adapted to receive the pin member, wherein the body is adapted for fastening the pin member within the passage. Preferably, the body comprises a fastener for fastening the pin member within the passage by holding the pin member in position. Preferably, the fastener comprises magnetic material. Preferably, the fastener comprises at least one magnet located within the passage. Preferably, the pin member comprises at least one portion for abutment to the magnet, the at least one portion comprising metallic material for securing the pin member within the passage.

According to another aspect of the invention there is provided an anchoring method, the method comprising: providing an anchor extending through a support surface, the anchor providing a elongate passage therein; the elongate passage configured to receive and support a pin member, the elongate passage having an open end providing an opening; inserting the pin member through the opening into the passage; and fastening the pin member within the passage using magnetic material that holds the pin member in position.

Preferably the magnetic material allows the pin member to be detached by a pulling force applied to the pin member, when the pin member has been inserted through the opening into position within the passage.

Preferably the magnetic material is provided by the anchor with the magnetic material being located at an end of the passage opposite the open end of the passage.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

DETAILED DESCRIPTION OF THE DRAWINGS

FIGS. 1 to 5 illustrate an anchoring system 10 according to a first preferred embodiment of the present invention. The anchoring system 10 comprises an anchor 12 and a pin member 14. The anchor 12 comprises a body 16 configured to be inserted through a support surface 18 provided by a support 20 in the form of a body of rock.

The body 16 has an elongate passage 22 that is configured to receive and support the pin member 14. The pin member 14 comprises a pin section 24 and a laser section 26. The laser section 26 includes a switch 28. The switch 28 is advantageously available for actuation on the laser section 26. The switch 30 can be manually operated when the pin member 14 is located in position within the passage 22.

The elongate passage 22 has an open end 30 providing an opening 32. The opening 32 is provided for receiving an end 34 of the pin member 14 therethrough. The anchor 12 and pin member 14 advantageously provide a fastening arrangement 36 for fastening the pin member 14 within the passage 22 (See FIG. 3).

Figure 1:
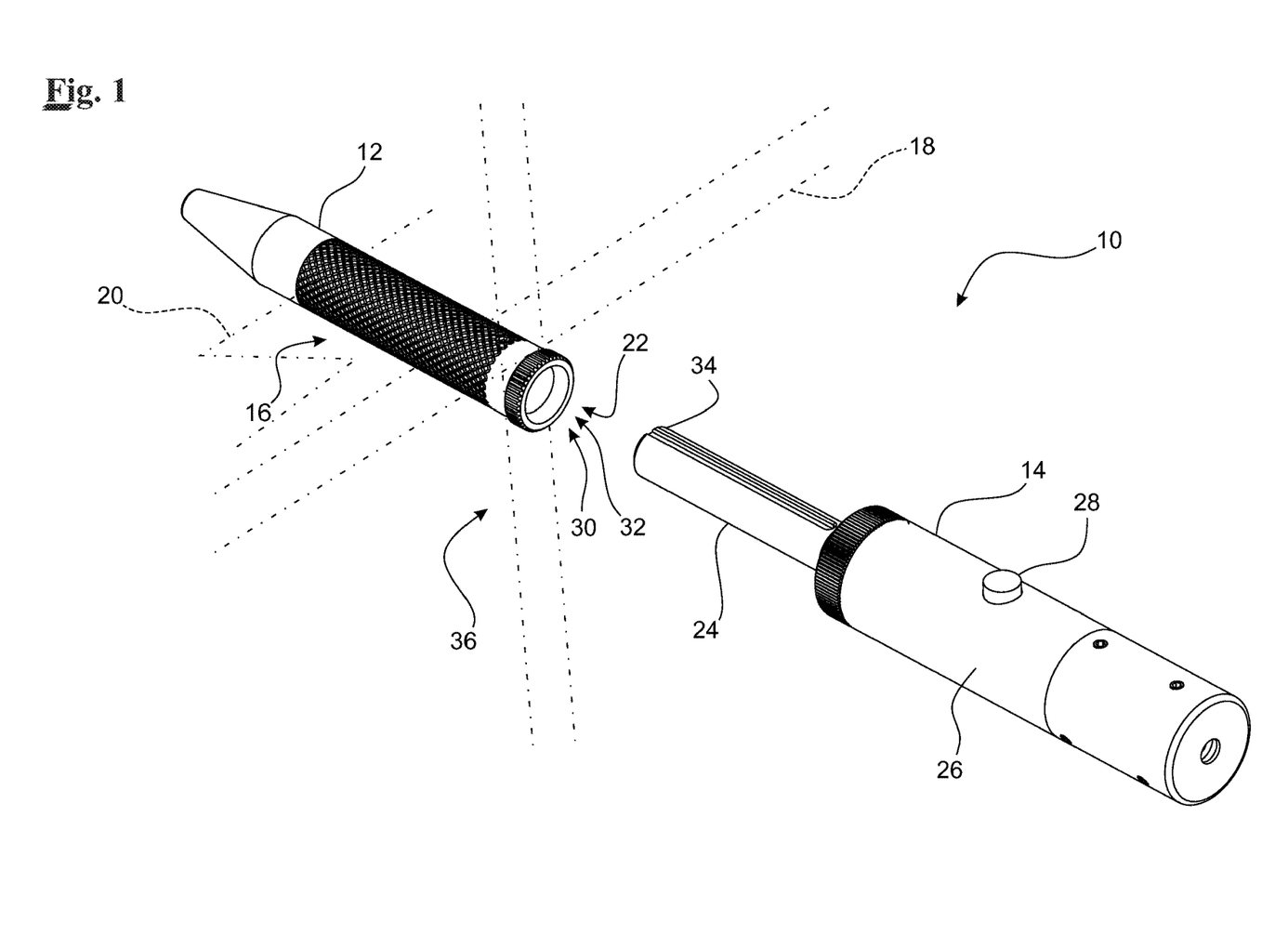
FIG. 1 is a perspective view of an anchoring system according to a first preferred embodiment of the present invention.
Figure 2:
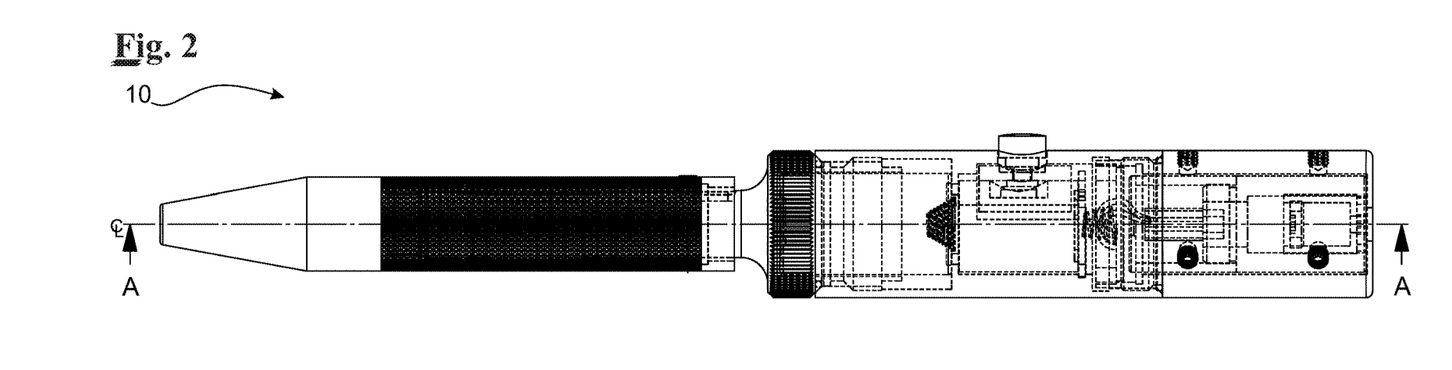
FIG. 2 is an x-ray view of the anchoring system shown in FIG. 1.
Figure 3:
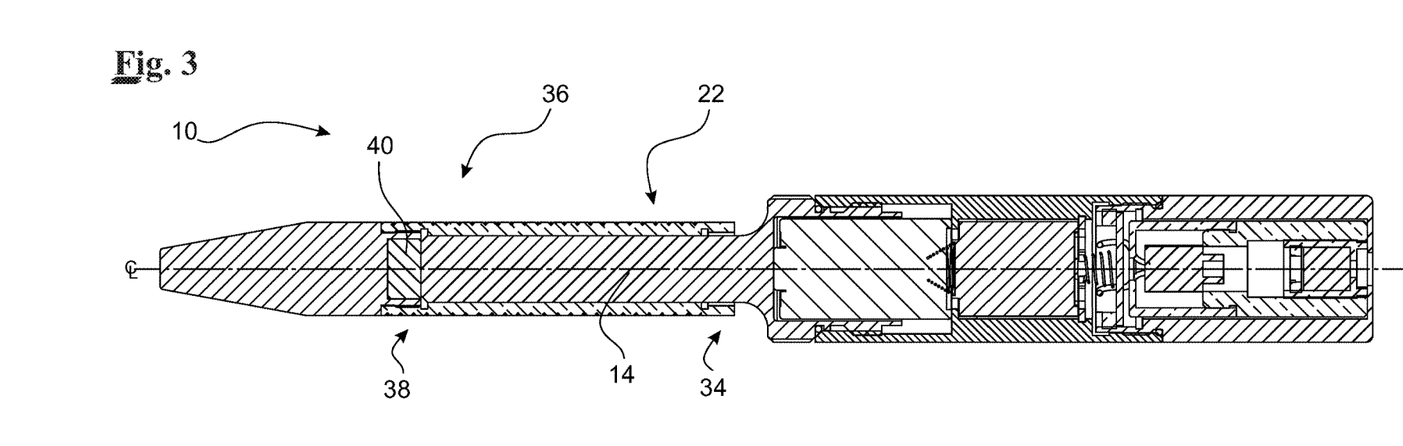
FIG. 3 is a cross sectional view of the anchoring system shown in FIG. 1, the cross section taken along the line A-A.

In this embodiment, the fastening arrangement 36 is able to magnetically hold the pin member 14 within the passage when the pin member 14 has been inserted through the opening 28 into position within the passage 22.

More specifically, the fastening arrangement 30 includes magnetic material for fastening the pin member 14 within the passage 22 by holding the pin member 14 in position. The magnetic material allows the pin member 14 to be detached from the anchor 12 by applying a pulling force to the pin member 14.

In the present embodiment, the magnetic material is provided by the anchor 12 with the magnetic material being located at an end 38 of the passage 22 that is opposite the open end 34 of the passage 22.

The magnetic material is provided in the form of a magnet 40 positioned at the terminal end 38 of the passage 22. The face 42 of the pin member 14 provides metallic material that interacts with the magnet 40 to provide magnetic attraction.

Figure 4:
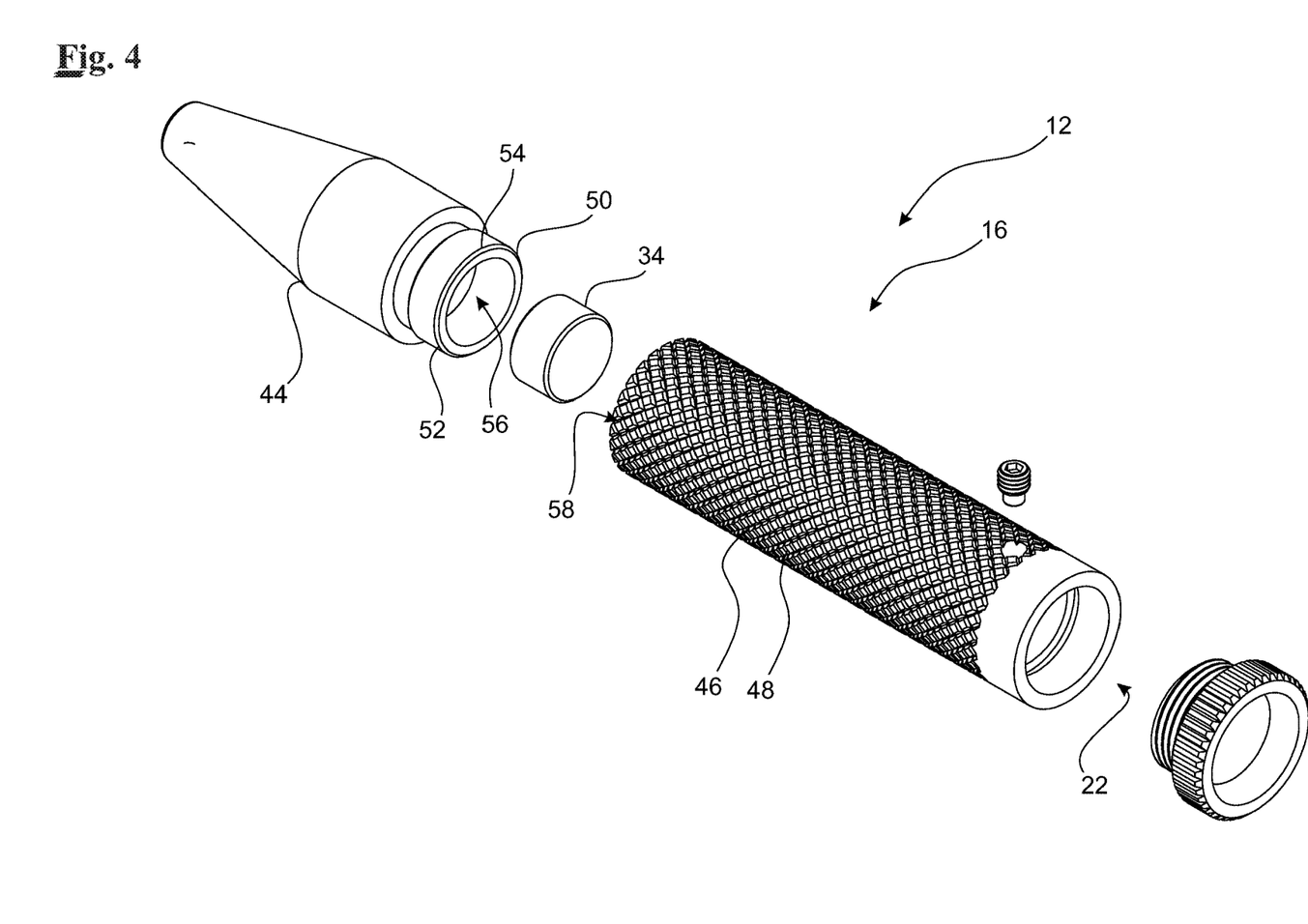
FIG. 4 is an exploded view of a component of the anchoring system shown in FIG. 1.

Referring to FIG. 4, the body 16 of the anchor 12 includes an endcap 44 and a body portion 46. The body portion comprises a cylinder 48 for providing the elongate passage 22. The endcap 38 provides a mount 50 for mounting the magnet 34. The endcap 38 includes a connector 52 that is able to be connected to the anchor body portion 46. The connector 52 provides an annular portion having a slightly larger diameter than the passage 22 at the terminating end of the cylinder 48.

The mount 44 is provided in the form of head portion 54 having a recess 56 in which the magnet 34 is received. This is again achieved using a pressfit.

The mount 44 provides a press fit connector 52 that is configured to be received in the bore 58 of the body portion 46. Various threaded ends on both the mount 44 and the cylinder 42 (and other arrangements) would of course be possible.

As would be apparent, the magnetic material could in other embodiments be provided by the pin member 14. In this regard, an inversion of the system described would be to replace the terminating end of the pin member 14 with magnetic material and replace the magnet 34 with metallic material that is attracted by the magnet. As would be apparent, some embodiments may have a magnet on both the anchor 10 and the pin member 14. In the current embodiment the fastening arrangement 30 includes a single magnet 34 located at the bottom of the passage 22.

Figure 5:
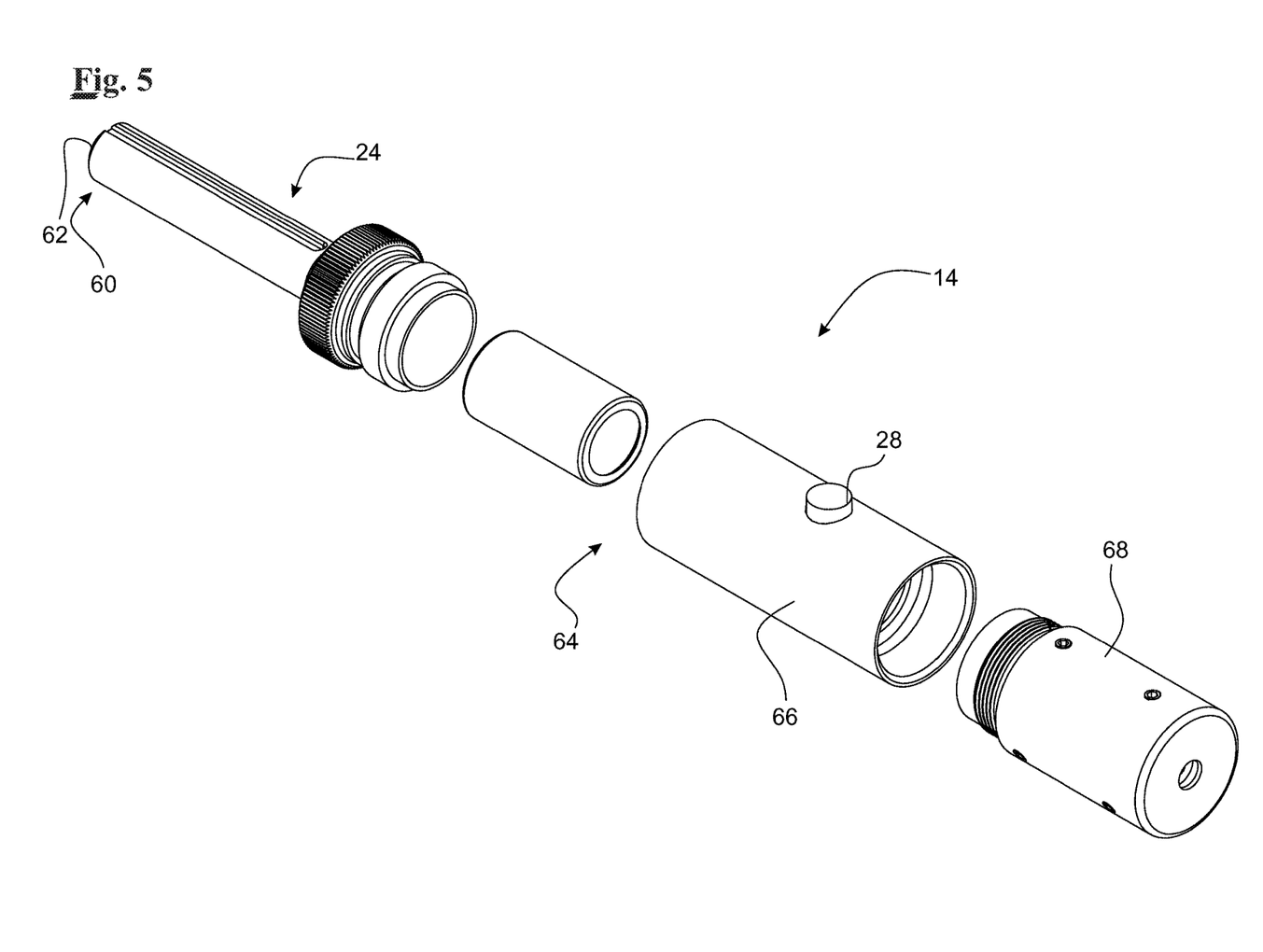
FIG. 5 is an exploded view of a further component of the anchoring system shown in FIG. 1.

Referring to FIG. 5, the pin member 14 is configured to have lasers attached and replaced. The pin member is provided for abutting the magnet 34 at a terminating end 60. A face 62 of the pin member 14 is arranged to bear against the magnet 34. Other arrangements are of course possible. The pin member comprises a pin section 24 and a switch assembly 64 providing the switch 28. The switch assembly 64 includes a connector 66 that provides the switch 28. The connector/mount 66 allows lasers 68 to be readily attached and detached.

A pin member 14 that is configured to have lasers attached with a magnetic terminating end 60 provides an embodiment of the present invention in its own right. Similarly an anchor having a magnet in a passage provides a separate embodiment. Anchors 12 and pin members 14 may be sold separately.

The anchoring system provides as a laser survey system for mark-ups in mining environments, typically for blasting operations.

The present application claims priority from Australian provisional application 20111 filed 26 Jul. 2015. FIGS. 6 to 11 are the same as those described in the provisional application. These embodiments provide further description. Among other things the embodiments describe an anchoring system 12 having an anchor shown in the drawings. The numbers used do not correspond with numbers used in relation to the embodiment described in relation to FIGS. 1 to 5.

Figure 6:
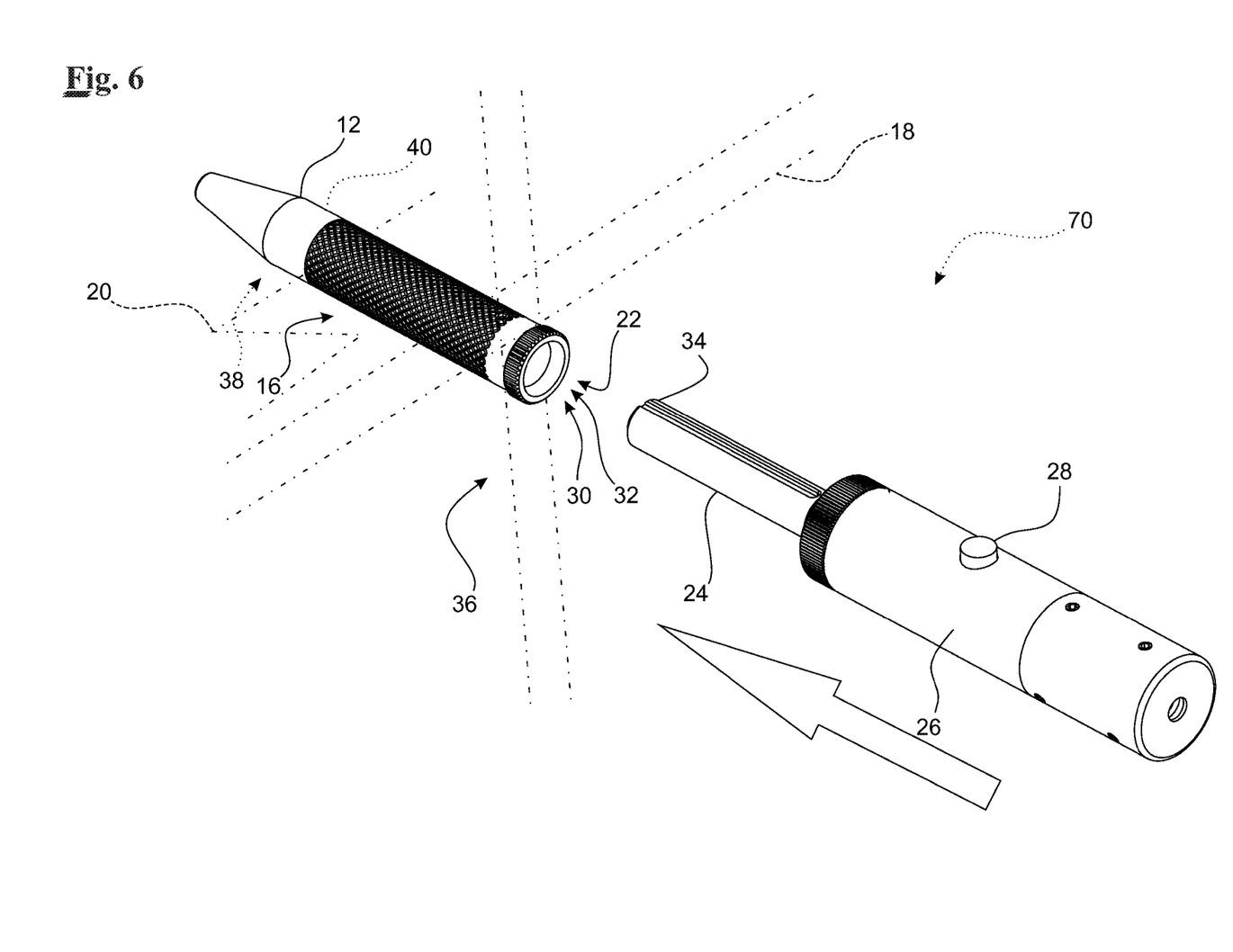
FIG. 6 is a schematic view of a method according to another preferred embodiment of the present invention.

Referring to FIG. 6, there is shown a method 70 according to another embodiment of the present invention. In the method 70 the anchor 12 is provided in the support surface 18. The anchor 12 provides the elongate passage 22 therein. The operator inserts the pin member 14 through the opening 32 into the passage 22. The method 70 includes fastening the pin member 14 within the passage 22 using magnetic material 40 that holds the pin member 14 in position. The magnetic material 40 allows the pin member 14 to be detached by a pulling force applied to the pin member 14, when the pin member 14 has been inserted through the opening 32 into position within the passage 22. The magnetic material 40 is provided by the anchor as a magnet 40 with the magnetic material 40 being located at an end 38 of the passage 22 opposite the open end 30 of the passage.

Figure 7:
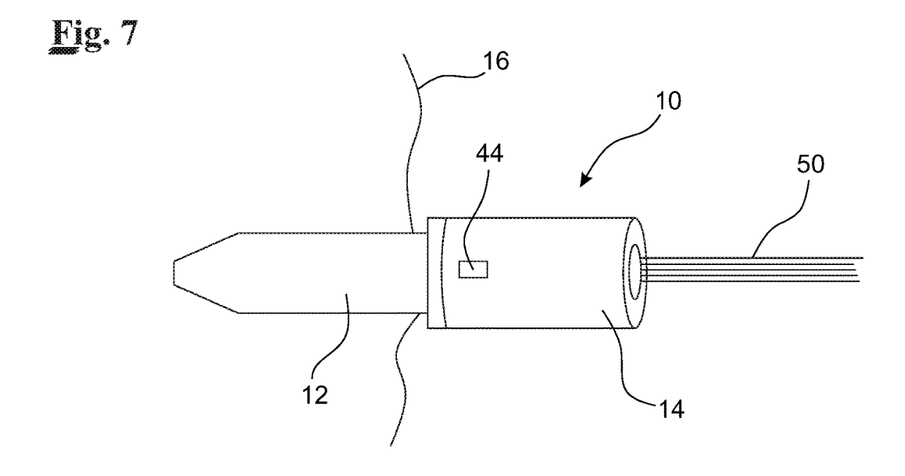
FIG. 7 is a perspective view of a survey instrument attached to an anchoring means in accordance with an embodiment of the invention.

Referring to FIG. 7, an embodiment of the present invention relates to an anchoring system that can be used for fastening survey instruments 10 to walls of underground mines. The anchoring system comprises an anchoring means 12 that is adapted to be inserted into the wall of the underground mines. The anchoring means 12 is adapted to receive a survey instrument 10. The survey instrument 10 comprises a laser 14. The laser 14 may be oriented towards a direction—substantially parallel to the anchoring means 12—by attaching the survey instrument 10 to the anchoring means 12.

FIG. 7 shows a survey instrument 10 attached to a wall 16 such as the wall of an underground mine. As depicted in FIG. 6, the anchoring means 12 is imbedded in the wall 16, and the survey instrument 10—incorporating the laser 14—is fastened to the anchoring means 12. In this particular arrangement the laser 14 is oriented substantially perpendicular to the wall 16 because the anchoring means 12 is embedded substantially perpendicular to the wall 16. In other arrangements the anchoring means 12 may be embedded in the wall 16 in any other orientation allowing the laser 14 to be oriented in other directions than the one shown in FIG. 6.

Figure 8:
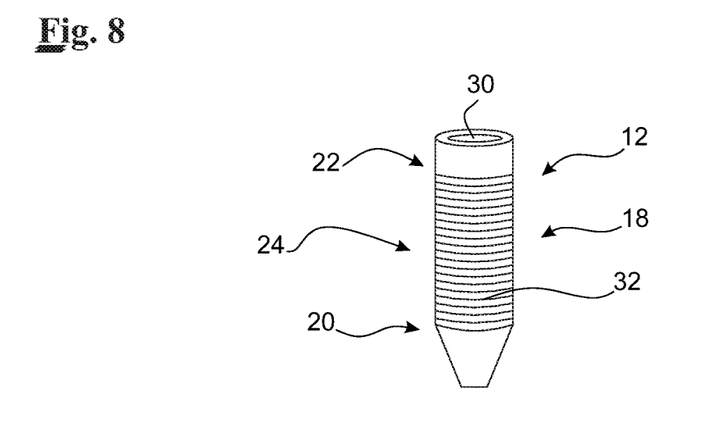
FIG. 8 is a perspective view of the anchoring means shown in FIG. 6.

FIG. 8 shows a particular arrangement of an anchoring means 12. The anchoring means 12 comprises a body 18. The body 18 comprises a distal end 20 and a proximal end 22 and a centre section 24 located between the distal end 20 and the proximal end 22.

Figure 12:
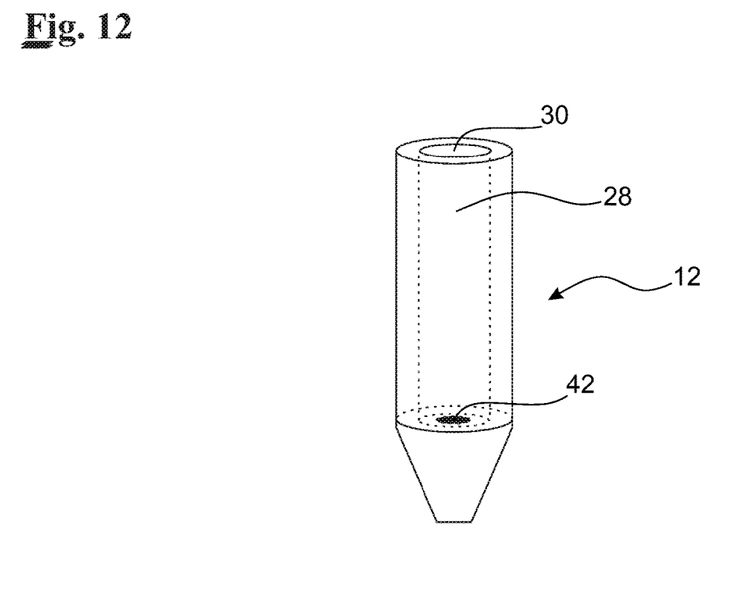
FIG. 12 is a schematic x-ray perspective view of the anchoring means shown in FIG. 2 showing the interior of the anchoring means.

The body 18 is of cylindrical configuration and comprises a passage 28—see FIG. 12. The body 18 comprise an opening 30 located at the proximal end 22. The opening 30 provides access to the passage 28. As will be described with reference to the method of operation of the survey instrument 10, the passage 28 allows securing the laser 14 to the anchoring means 12.

Further, the exterior surface 32 of the centre section 24 is adapted to secure the anchoring means 12 in the wall 16. In the particular arrangement shown in FIG. 8, the exterior surface 32 comprises an abrasive surface that hinders extraction of the body 18 from the wall 16.

The distal end 20 is adapted for insertion in the wall 16. In the particular arrangement shown in the figures, the distal end 22 is of conical shape. This facilitates insertion of the anchoring means 12 into the wall 16.

The proximal end 22 comprises the opening 30. In this manner, either the survey instrument 10 or a cap 26 (see FIG. 9) may be attached to the proximal end 22 of the anchoring means 12. For, this the cap 26 may comprise a threaded end and the proximal end 22 of the anchoring means 12 may comprises a counterpart threaded end to permit the cap 26 to be screwed onto the anchoring means 12 for closure thereof. In a particular arrangement, the cap 26 comprises metallic material.

Figure 9:
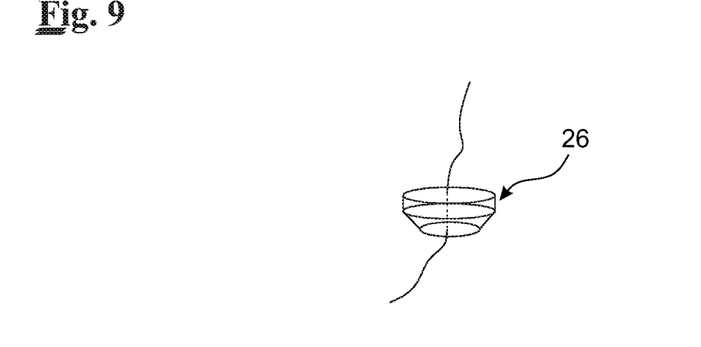
FIG. 9 is a perspective of a cap adapted to be mounted onto the anchoring means shown in FIG. 2 for closing thereof.

As will be described at a later stage the cap 26 allows closing the body of the attachment means 12 while the survey instrument 10 is not in use. This impedes dirt from entering the body 18.

Figure 10:
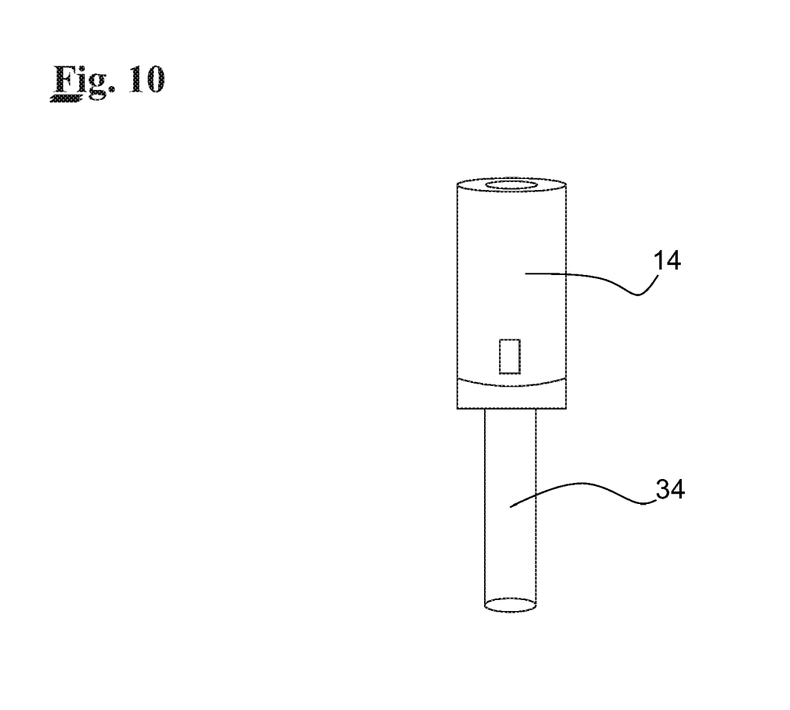
FIG. 10 is a perspective view of the survey instrument shown in FIG. 5.
Figure 11:
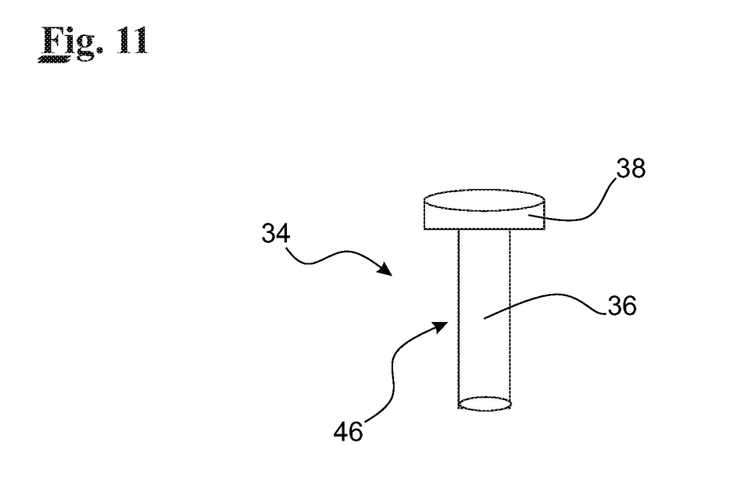
FIG. 11 is a perspective view of an alignment member of the survey instrument shown in FIG. 4.

We refer now to FIGS. 10 and 11.

As was mentioned before, the survey instrument 10 is adapted to be attached to the anchoring means 12. The survey instrument 10 comprises an alignment member 34 extending from the laser 14. The alignment member 34 is adapted to be received within the passage 28 of the anchoring means 12. For this, the alignment member 34 comprises a rod section 36. The rod section 36 is adapted to be inserted inside the passage 18. This allows attaching the survey instrument 10 to the anchoring means 12.

In the particular arrangement shown in the figures, the alignment member 34 is releasably attached to the laser 14. This allows for attachment and detachment of the alignment member 34 from the laser 14.

The alignment member 34 comprises a socket 40 and the rod section 36 protruding from the socket 40—see FIG. 10. The socket 40 is adapted to be attached to the laser 14 defining the survey instrument 10.

In a particular arrangement, the socket 40 may comprise a threaded section; in this particular arrangement the laser 14 comprises a counterpart threaded section at the end opposite to the end of the laser from which the light is emitted. The threaded sections allow screwing the laser 14 to the alignment member 34 for attaching thereof. The laser 14 may be detached from the alignment member 34 by unscrewing the laser 14 from the socket 40.

Figure 13:
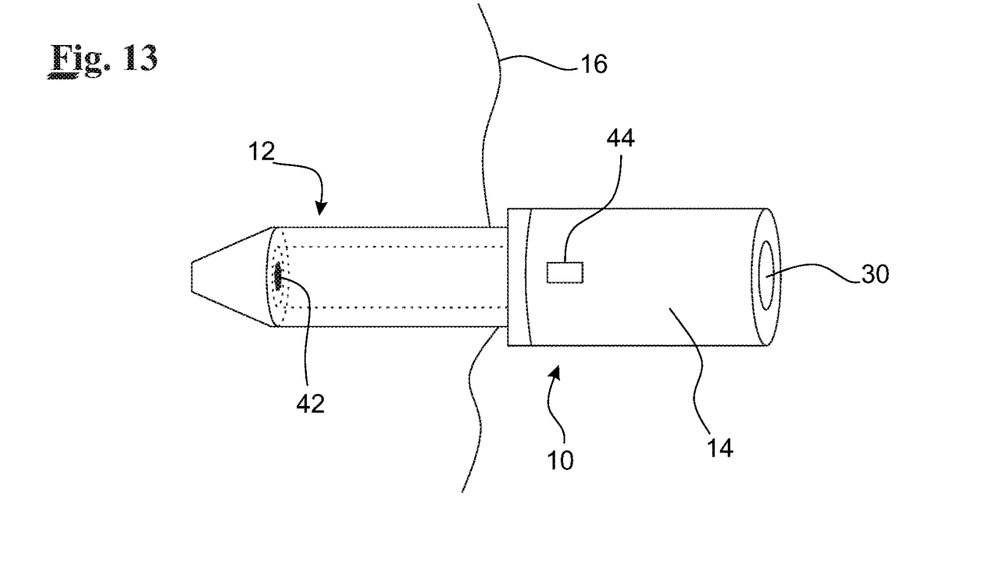
FIG. 13 is a schematic x-ray perspective view of a survey instrument attached to the anchoring means shown in FIG. 12.

We refer now to FIGS. 12 and 13.

As was mentioned before, in accordance with the present embodiment of the invention, the survey instrument 10 is attached to the attachments means 12 to align the laser 14 so that the light emitted by the laser 14 may be directed towards a direction substantially parallel to the direction of the anchoring means 12.

FIG. 12 depicts a schematic view of the attachment means 12 showing the passage 28 extending through the attachment means 12. In accordance with the present embodiment of the invention, the survey instrument 10 is attached to the attachment means 12 by inserting the rod section 36 of the survey instrument 10 into the passage 28 of the anchoring means 12.

The anchoring means 12 in accordance with the present embodiment of the invention is adapted for releasably attaching the rod section 36 inside the passage 28. The fact that the survey instrument 10 is releasably attached to the anchoring means 12 is advantageous. This is because it allows attaching the laser 14 to the anchoring means 12 during use of the survey instrument 10. After use of the survey instrument 10, the survey instrument 10 may be detached from the anchoring means 12. After extraction of the survey instrument 10, the anchoring means may be closed using the cap 26 to, for example, impede that dirt enters the passage 28.

To releasably attach the survey instrument 10 to the anchoring means 12, the survey instrument 10 comprises attachment means that allows releasably attaching the alignment member 34 within the passage 28 of the anchoring means 12.

In a particular arrangement of the present embodiment of the invention, the attachment means comprise magnetic material allowing the rod section 36 to be secured within the passage 28. For example, in an arrangement, the attachment means 12 may comprise a magnet 42. In the particular arrangement of FIG. 12, the anchoring means 12 comprises a disc shaped magnet 42. In this particular arrangement, the magnet 42 is located at the bottom end of the passage 28. In this manner, the rod section 36 of the laser 14 abuts the magnet 42 when the rod section 36 is located in the passage 28 of the anchoring means 12—see FIG. 13. In this manner, the survey instrument 10 is kept attached to the anchoring means 12 during use of the survey instrument 10. After use of the survey instrument 10, the survey instrument 10 may be detached from the anchoring means 12 by applying a pulling force to the laser 14. In this particular arrangement, the rod section 36 comprises, for example, metallic material located, at least, at the distal end of the rod section 36 for fastening the rod section 36 to the magnet 42 and, thus, securing the survey instrument 10 to the anchoring means 12.

Further, the laser 14 comprises switch means for selectively turning on and off the laser 14. The particular arrangement of laser 14 shown in the figures comprises a switch 44 that is incorporated in the laser 14. This allows the laser 14 to be operated independently from the anchoring means 12; thus, the laser 14 may be operated not exclusively in conjunction with the anchoring means 12; instead, the laser 14 may be operated independently from the anchoring means 12 and used at locations distal from the anchoring means 12.

It is particularly advantageous that the laser 14 comprises a switch 44 located relatively distal to the anchoring means 12 and that can be operated independently from the anchoring means 12. This is because the switch means that are incorporated in the conventional survey instrument 10 may be omitted. As was mentioned in the section describing the Background Art, the conventional anchoring means and survey instruments include switch means for operating of the laser wherein the switch means are operated during attachment of the survey instrument to the anchoring means. These switch means include a plurality of working parts making the survey instrument 10 expensive to produce and highly susceptible to damage in particular due to being operated in underground mines.

We refer now to me method of operation of the anchoring system and the survey instrument.

In operation, a user inserts the anchoring means 12 into the wall of an underground mine. The attachment means 12 are inserted into the wall 16 in such a manner that the survey instrument 10 including the laser 14 may be oriented to the desired direction. After securing the attachment means 12 into the wall 16, the survey instrument 10 is attached to the anchoring means 12 by inserting the rod section 36 into the passage 28 of the anchoring means 12. As mentioned before, the anchoring means 12 comprises means, such as a magnet 42, for fastening the rod section within the passage 28 impeding detachment of the survey instrument 10 from the anchoring means 12. Once the survey instrument 10 is attached to the anchoring means 12, the laser 14 may be turned on via the switch means 44. As mentioned before, turning on and off of the laser 14 is conducted via switch means 44 that work independently from the anchoring means 22.

After use of the survey instrument 10, the survey instrument 10 may be detached from the anchoring means 12 by applying a pulling force to the survey instrument 10 to extract the rod section 36 of the survey instrument 10 from the passage 28 of the anchoring means 12. At this stage, after extraction of the survey instrument 10 the laser 14 may be tuned off via the switch 44.

Modifications and variations as would be apparent to a skilled addressee are deemed to be within the scope of the present invention. For example, the anchoring means 12 in accordance to the present embodiment of the invention comprise a disc shaped magnet 42 that is located at the bottom of the passage 28 and the rod section 36 of the survey instrument 10 comprises metallic section for abutment to the magnet 42. In other arrangements, the rod section 36 may comprise magnetic material and the anchoring means 12 comprises at least a portion of metallic material for abutment to the magnetic material of the rod section 36. In alternative arrangement, other means for fastening the rod section 36 inside the anchoring means 12 may be provided. For example, the rod section 36 may be configured as a ball detent pin.

Further, it should be appreciated that the scope of the invention is not limited to the scope of the embodiments disclosed. By way of example, the anchoring system of the present embodiment has been described for use in conjunction with survey instruments. However, in accordance with other embodiments, the anchoring system may be used to attach other type of goods to walls. In this particular arrangement, the alignment member 34 may comprise a means for attaching these type of goods to the alignment member 34.

Furthermore, it was mentioned that the laser 14 may be operated (for example, turned on and off) independently to the anchoring means 12; and, that this was particularly advantageous because the laser could be used at a remote location from the anchoring means. In accordance with an alternative arrangement of the present embodiment, the survey instrument 10 may comprise an alignment member 34 adapted to receive a lasers 14, wherein the laser 14 do not necessarily incorporate a threaded section for screwing or unscrewing of the laser 14 to or from the alignment member 34. In this alternative arrangement, the alignment member 34 comprises means for releasably attaching conventional lasers that are not necessarily configured to operate in conjunction with the anchoring means 12. This is particularly advantageous because it allows using a great variety of lasers and in particular pen-sized lasers for attachment to the alignment member 34 to define the survey instrument 10.

As would be apparent, various alterations and equivalent forms may be provided without departing from the spirit and scope of the present invention. This includes modifications within the scope of the appended claims along with all modifications, alternative constructions and equivalents.

There is no intention to limit the present invention to the specific embodiments shown in the drawings. The present invention is to be construed beneficially to the applicant and the invention given its full scope.

It is to be recognised that any discussion in the present specification is intended to explain the context of the present invention. It is not to be taken as an admission that the material discussed formed part of the prior art base or relevant general knowledge in any particular country or region.

Throughout this specification, unless the context requires otherwise, the word "comprise" or variations such as "comprises" or "comprising", will be understood to imply the inclusion of a stated integer or group of integers but not the exclusion of any other integer or group of integers.

The claims defining the invention are as follows:

1. An anchoring system comprising an anchor and an elongate pin member, the anchor comprising a body configured to be inserted in a support surface, the body having an elongate passage configured to receive and support the elongate pin member, the elongate passage having an open end providing an opening, the opening configured to receive an end of the elongate pin member therethrough; and the anchor and elongate pin member providing a fastening arrangement for fastening the elongate pin member within the elongate passage when the elongate pin member is inserted through the opening into position within the elongate passage; wherein the fastening arrangement includes magnetic material for fastening the elongate pin member within the elongate passage by holding the elongate pin member in position; and the magnetic material allows the elongate pin member to be detached by a pulling force applied to the elongate pin member, when the elongate pin member has been inserted through the opening into position within the elongate passage.

2. An anchoring system as claimed in claim 1 wherein the magnetic material is provided by the anchor with the magnetic material being located at an end of the elongate passage opposite the open end of the elongate passage.

3. An anchoring system as claimed in claim 1 wherein the magnetic material comprises a magnet and the body includes an endcap and a body portion; the body portion providing the elongate passage; and the endcap having a mount for mounting the magnet and a connector configured to be connected to the body portion.

4. An anchoring system as claimed in claim 1 wherein the magnetic material is provided by the elongate pin member with the magnetic material being located at an end of the elongate pin member, the end of the elongate pin member being the end that is first inserted through the opening of the elongate passage when positioning the elongate pin member within the elongate passage.

5. An anchoring system as claimed in claim 1 wherein the magnetic material comprises at least one magnet located within the elongate passage for fastening the elongate pin member within the elongate passage by holding the elongate pin member in position.

6. An anchoring system as claimed in claim 5 wherein a portion of the elongate pin member is provided for abutting the at least one magnet, the portion comprising metallic material for securing the elongate pin member within the elongate passage.

7. An anchoring system as claimed in claim 6 wherein the portion of the elongate pin member comprises an end of the elongate pin member that is first inserted through the opening of the elongate passage when positioning the elongate pin member within the elongate passage.

8. An anchoring system comprising an anchor, the anchor comprising a body adapted to be inserted in a support surface, the body having an elongate passage configured to receive and support an elongate pin member, the elongate passage having an open end providing an opening, the opening configured to receive an end of the elongate pin member therethrough; the anchor including magnetic material for fastening the elongate pin member within the elongate passage when the elongate pin member is inserted through the opening into position within the elongate passage by holding the elongate pin member in position; and the magnetic material allows the elongate pin member to be detached by a pulling force applied to the elongate pin member, when the elongate pin member has been inserted through the opening into position within the elongate passage.

9. An anchoring system as claimed in claim 8 wherein the magnetic material comprises a magnet and the body includes an endcap and a body portion; the body portion providing the elongate passage; and the endcap having a mount for mounting the magnet and a connector configured to be connected to the body portion.

10. An anchoring system as claimed in claim 8 wherein the anchor comprises a survey anchor for mining environments, with the elongate pin member providing a portion of a survey instrument.

11. An anchoring method, the method comprising: providing an anchor extending through a support surface, the anchor providing an elongate passage therein; the elongate passage configured to receive and support an elongate pin member, the elongate passage having an open end providing an opening; inserting the elongate pin member through the opening into the elongate passage; and fastening the elongate pin member within the elongate passage using magnetic material that holds the elongate pin member in position; with the magnetic material allowing the elongate pin member to be detached by a pulling force applied to the elongate pin member, when the elongate pin member has been inserted through the opening into position within the elongate passage.

12. An anchoring method as claimed in claim 11 wherein the magnetic material is provided by the anchor with the magnetic material being located at an end of the elongate passage opposite the open end of the elongate passage.

* * * * *